(12) United States Patent
Feng et al.

(10) Patent No.: US 11,218,354 B2
(45) Date of Patent: Jan. 4, 2022

(54) CLUSTERING-BASED FREQUENCY DEVIATION DETERMINATION AND ELIMINATION METHOD AND DEVICE, AND ELECTRONIC APPARATUS

(71) Applicant: Beijing University of Posts and Telecommunications, Beijing (CN)

(72) Inventors: Zhiyong Feng, Beijing (CN); Kezhong Zhang, Beijing (CN); Che Ji, Beijing (CN); Zhiqing Wei, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/270,176

(22) PCT Filed: Aug. 16, 2019

(86) PCT No.: PCT/CN2019/101070
§ 371 (c)(1),
(2) Date: Feb. 22, 2021

(87) PCT Pub. No.: WO2020/042938
PCT Pub. Date: Mar. 5, 2020

(65) Prior Publication Data
US 2021/0203537 A1 Jul. 1, 2021

(30) Foreign Application Priority Data
Aug. 31, 2018 (CN) .......................... 201811011144.1

(51) Int. Cl.
*H04L 5/00* (2006.01)
*H04L 27/26* (2006.01)

(52) U.S. Cl.
CPC .............................. *H04L 27/2657* (2013.01)

(58) Field of Classification Search
CPC ............ H04L 27/2621; H04L 27/2657; H04L 27/3863; H04L 43/04; H04L 27/06;
(Continued)

(56) References Cited

U.S. PATENT DOCUMENTS

2015/0092724 A1* 4/2015 Xiao ................... H04L 27/3863
370/329
2017/0310401 A1 10/2017 Fludger et al.

FOREIGN PATENT DOCUMENTS

CN 101079858 A 11/2007
CN 103023833 A 4/2013
(Continued)

OTHER PUBLICATIONS

Oct. 28, 2019, International Search Report for International Patent Application No. PCT/CN2019/101070.
(Continued)

*Primary Examiner* — Phuoc H Doan
(74) *Attorney, Agent, or Firm* — Clements Bernard Baratta; Lawrence A. Baratta, Jr.

(57) ABSTRACT

Clustering-based methods, apparatuses for frequency offset determination and elimination and electronic devices are disclosed. The clustering-based method for frequency offset determination includes: determining a constellation diagram for a received signal; determining N different values within a preset frequency interval, as N frequency offset estimates for a frequency offset of the received signal; for each of the frequency offset estimates, correcting the constellation diagram based on the frequency offset estimate to obtain a corrected constellation diagram, clustering signal points on the corrected constellation diagram, and calculating an area of a signal region in the corrected constellation diagram after clustering; and determining a frequency offset estimate corresponding to a signal region with a minimum area as a value of the frequency offset. The embodiments of the
(Continued)

present invention can improve the accuracy and stability of the calculated value of the frequency offset.

9 Claims, 5 Drawing Sheets

(58) Field of Classification Search
CPC .......... H04L 27/0008; H04W 72/0453; H04W 72/0446; G06N 3/08; G06N 20/00; G06N 3/0472; H04B 17/3911; H04B 17/3912
See application file for complete search history.

(56) References Cited

FOREIGN PATENT DOCUMENTS

| | | |
|---|---|---|
| CN | 104702554 A | 6/2015 |
| CN | 105187333 A | 12/2015 |
| CN | 106559375 A | 4/2017 |
| CN | 107342960 A | 11/2017 |
| CN | 109120568 A | 1/2019 |
| EP | 2 842 283 B1 | 12/2016 |
| JP | 5577904 B2 | 8/2014 |
| TW | 201203964 A | 1/2012 |

OTHER PUBLICATIONS

Oct. 28, 2019, Written Opinion of the International Searching Authority (including the English Translation) for International Application No. PCT/CN2019/101070.

\* cited by examiner

8-PSK signal without frequency offset

8-PSK signal with frequency offset

FIG. 2b

16-QAM signal without frequency offset

16-QAM signal with frequency offset

FIG. 2c

16-ASK signal without frequency offset

16-ASK signal with frequency offset

CLUSTERING-BASED FREQUENCY DEVIATION DETERMINATION AND ELIMINATION METHOD AND DEVICE, AND ELECTRONIC APPARATUS

The present application claims the priority to a Chinese Patent Application No. 201811011144.1, filed with the China National Intellectual Property Administration on Aug. 31, 2018 and entitled "Clustering-Based Frequency Deviation Determination and Elimination Method and Device, and Electronic Apparatus", which is incorporated herein by reference in its entirety.

TECHNICAL FIELD

The present application relates to the field of communication technology, and in particular, to clustering-based methods and apparatuses for frequency offset determination and elimination, and electronic devices.

BACKGROUND

With the rapid development of wireless communication technologies, people are having a higher demand on quality of wireless communication. In the field of wireless communication, a frequency offset between a transmitter and a receiver may cause significant reduction of the accuracy that the receiver identifies the received signal. Specifically, the frequency offset would cause the constellation diagram of the received signal to be rotated, and the rotation of the constellation diagram in turn results in a large distortion of the received signal. Therefore, the accuracy of identifying the received signal at the receiver will be significantly reduced.

An existing commonly used approach for determining a value of a frequency offset includes: calculating an argument of a complex signal generated from a received signal, and then calculating the frequency offset using the calculated argument. In such an approach, a discrete number n for the received signal is required in calculating the argument.

However, the calculated value of the argument of the complex signal varies depending on the discrete number n for the received signal, which makes the value of the frequency offset calculated by using the argument vary accordingly. Therefore, in the existing approach for determining a value of a frequency offset, the calculated value of the frequency offset may not be constantly accurate.

SUMMARY

The objective of embodiments of the present application is to provide clustering-based methods and apparatuses for frequency offset determination and elimination, and electronic devices, to provide an improved and stable accuracy of the calculated value of the frequency offset. Specific details of the technical solutions are provided below.

In the first aspect, an embodiment of the present application provides a clustering-based method for frequency offset determination. The method includes:

determining a constellation diagram for a received signal;

determining N different values within a preset frequency interval, as N frequency offset estimates for a frequency offset of the received signal;

for each of the frequency offset estimates, correcting the constellation diagram based on the frequency offset estimate to obtain a corrected constellation diagram, clustering signal points on the corrected constellation diagram, and calculating an area of a signal region in the corrected constellation diagram after clustering; and determining a frequency offset estimate corresponding to a signal region with a minimum area as a value of the frequency offset.

Optionally, determining N different values within a preset frequency interval, includes:

selecting from the preset frequency interval the N different values at equal intervals.

Optionally, correcting the constellation diagram based on the frequency offset estimate to obtain a corrected constellation diagram, includes:

performing frequency offset elimination on each of the signal points on the constellation diagram by using the frequency offset estimate to obtain the corrected constellation diagram.

Optionally, clustering signal points on the corrected constellation diagram, includes:

dividing evenly the corrected constellation diagram into multiple grid cells;

calculating the number of signal point in each grid cell; and for each grid cell, using the grid cell as a non-cluster grid cell when the number of the signal points in the grid cell is less than a preset threshold; and using the grid cell as a cluster grid cell when the number of the signal points in the grid cell is not less than the preset threshold.

Optionally, calculating an area of a signal region in the corrected constellation diagram after clustering, includes:

calculating the number K of cluster grid cells in the corrected constellation diagram after clustering; and calculating the area S of the signal region in the corrected constellation diagram after clustering, as S=L×s; wherein s is an area of a cluster grid cell.

In the second aspect, an embodiment of the present application provides a clustering-based method for frequency offset elimination. The method includes:

determining a value of a frequency offset of a received signal by using the clustering-based method for frequency offset determination described in the first aspect; and performing frequency offset elimination on the received signal based on the value of the frequency offset.

In the third aspect, an embodiment of the present application provides a clustering-based apparatus for frequency offset determination. The apparatus includes:

a first determination module, configured for determining a constellation diagram for a received signal;

a second determination module, configured for determining N different values within a preset frequency interval, as N frequency offset estimates for a frequency offset of the received signal;

a calculation module, configured for, for each of the frequency offset estimates, correcting the constellation diagram based on the frequency offset estimate to obtain a corrected constellation diagram, clustering signal points on the corrected constellation diagram, and calculating an area of a signal region in the corrected constellation diagram after clustering; and a third determination module, configured for determining a frequency offset estimate corresponding to a signal region with a minimum area as a value of the frequency offset.

In the fourth aspect, an embodiment of the present application provides a clustering-based apparatus for frequency offset elimination. The apparatus includes:

a fourth determination module, configured for determining a value of a frequency offset of a received signal by using the clustering-based apparatus for frequency offset determination described in the third aspect; and an elimination module, configured for performing frequency offset elimination on the received signal based on the value of the frequency offset.

In the fifth aspect, an embodiment of the present application provides an electronic device, including a processor, a communication interface, a memory and a communication bus; wherein the processor, the communication interface and the memory communicate with each other via the communication bus;

the memory is configured for storing a computer program; and the processor is configured for, when executing the computer program stored in the memory, implementing the steps of the clustering-based method for frequency offset determination described in the first aspect.

In the sixth aspect, an embodiment of the present application provides an electronic device, including a processor, a communication interface, a memory and a communication bus; wherein the processor, the communication interface and the memory communicate with each other via the communication bus;

the memory is configured for storing a computer program; and the processor is configured for, when executing the computer program stored in the memory, implementing the steps of the clustering-based method for frequency offset elimination described in the second aspect.

In the seventh aspect, an embodiment of the present application provides a computer readable storage medium, having stored thereon instructions that, when executed by a computer, cause the computer to perform the steps of the clustering-based method for frequency offset determination described in the first aspect.

In the eighth aspect, an embodiment of the present application provides a computer readable storage medium having stored thereon instructions that, when executed by a computer, cause the computer to perform the steps of the clustering-based method for frequency offset elimination described in the second aspect.

In the ninth aspect, an embodiment of the present application provides a computer program product including instructions that, when executed by a computer, cause the computer to perform the steps of the clustering-based method for frequency offset determination described in the first aspect.

In the tenth aspect, an embodiment of the present application provides a computer program product including instructions that, when executed by a computer, cause the computer to perform the steps of the clustering-based method for frequency offset elimination described in the second aspect.

The solution of the embodiments of the present application takes into account the fact that the more severe the frequency offset is, the more the area of the signal region in the constellation diagram of the received signal will increase. In determining the frequency offset of the received signal, a constellation diagram for the received signal is determined; and N different values are then determined within a preset frequency interval, which are used as N frequency offset estimates. For each frequency offset estimation value, a corrected constellation diagram is obtained by correcting the constellation diagram using the frequency offset estimate, and the signal points on the corrected constellation diagram are clustered. The area of the signal region of the clustered signal points on the constellation diagram is calculated. A frequency offset estimate corresponding to a signal region with the minimum area is determined a value of the true frequency offset. In the embodiments of the present application, no argument of the received signal is required to be calculated, instead, the value of the frequency offset is estimated based on the fact that the area of the signal region in the constellation diagram is directly proportional to the value of the frequency offset. As a result, the accuracy and stability of the calculated value of the frequency offset can be improved, leading to a better estimation of the frequency offset.

Of course, any of the products or methods implementing the present application is not necessarily required to achieve all of the advantages described above.

BRIEF DESCRIPTION OF THE DRAWINGS

To more clearly illustrate the technical solutions in the embodiments of the present application and in the prior art, the accompanying drawings used for depicting the embodiments or the prior art will be briefly described below.

DETAILED DESCRIPTION

The following description is intended to convey thorough understanding of the technical solutions of the embodiments of the present application by providing embodiments in combination with the accompanying drawings. Obviously, the present application is not limited to the described embodiments, which are only some of and not all of the embodiments of the present application. All other embodiments obtained by those skilled in the art based on the embodiments herein without creative efforts shall fall within the scope of protection of the present application.

To address the issues in the prior art, the embodiments of the present application provide clustering-based methods and apparatuses for frequency offset determination and for frequency offset elimination, and electronic devices.

It should be noted that the clustering-based method for frequency offset determination provided by an embodiment of the present application may be implemented by a receiver in a wireless communication system. A digital signal received by the receiver during the wireless communication is regarded as a received signal. Since the received signal is a digital signal, the received signal is a sequence of discrete symbols.

Figure 1:
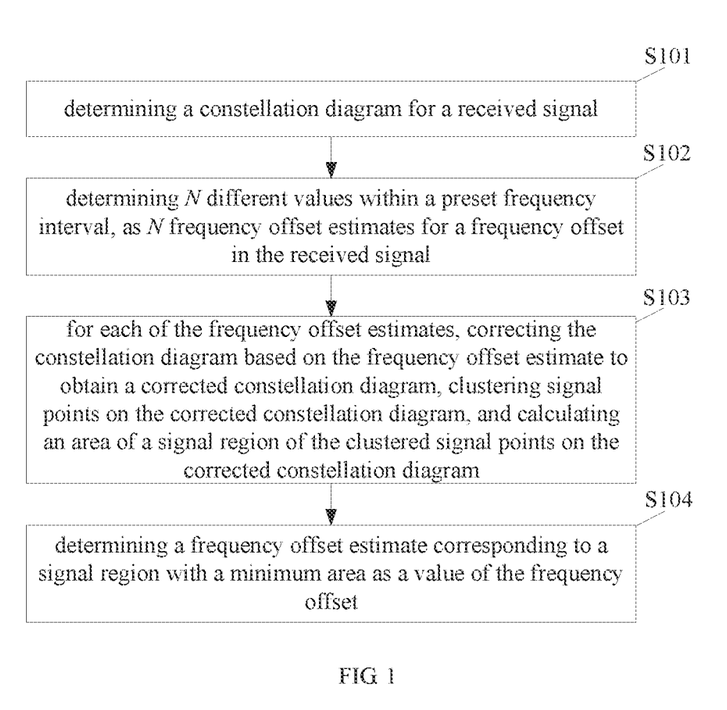
FIG. 1 shows a flowchart of a clustering-based method for frequency offset determination provided by an embodiment of the present application.

As shown in FIG. 1, the clustering-based method for frequency offset determination provided by an embodiment of the present application may include the following steps.

At step S101, a constellation diagram for a received signal is determined.

After receiving the received signal, for each of the discrete symbols of the received signal, the discrete symbol can be plotted on the constellation diagram based on the value of the real part and the value of the imaginary part of a complex number representing the discrete symbol. The constellation diagram of the received signal can thus be determined. Specifically, the value of the real part of a discrete symbol is taken as a coordinate of the discrete symbol on the X-axis of the constellation diagram, and the value of the imaginary part of the discrete symbol is taken as a coordinate of the discrete symbol on the Y-axis of the constellation diagram.

At step S102, N different values are determined within a preset frequency interval, which are used as N frequency offset estimates for the frequency offset of the received signal.

It can be understood that frequency offset occurs in the received signal. In order to determine a value for the frequency offset closest to the true value of the frequency offset of the received signal, multiple frequency offset estimates may be determined and are further compared with each other. It should be noted that the determination of the N different values within the preset frequency interval means that the N values in the preset frequency interval are determined as the N frequency offset estimates; wherein the N values are different frequency values. In the embodiment, the preset frequency interval can be set based on experience, and the N different values are determined as the N frequency offset estimates within this preset frequency interval. For example, the preset frequency interval may be set to $[-\pi/2, \pi/2]$.

As an exemplary implementation, the determination of the N different values within the preset frequency interval may include:

selecting from the preset frequency interval the N different values at equal intervals.

For example, the preset frequency interval may be evenly divided into N consecutive small intervals. In each small interval, a value at the start position, a value at the end position, or a value at the intermediate position of the small interval is determined, and N different values are thus determined in total from the N small intervals.

At step S103, for each of the frequency offset estimates, the constellation diagram is corrected based on the frequency offset estimate to obtain a corrected constellation diagram; signal points on the corrected constellation diagram are clustered; and the area of a signal region in the corrected constellation diagram after clustering is calculated.

After the frequency offset estimates are determined, for each of the frequency offset estimates, the constellation diagram of the received signal may be corrected based on the frequency offset estimate to obtain a corrected constellation diagram corresponding to the frequency offset estimate. The signal points (i.e., constellation points) on the corrected constellation diagram corresponding to the frequency offset estimate are clustered, and the area of a signal region in the corrected constellation diagram after clustering is calculated. Therefore, after step S103, each of the frequency offset estimates corresponds to a signal region, and the area of the signal region has been calculated.

As an exemplary implementation, the correction of the constellation diagram based on a frequency offset estimate to obtain a corrected constellation diagram, may include:

performing frequency offset elimination on each of the signal points on the constellation diagram by using the frequency offset estimate to obtain the corrected constellation diagram.

By performing the frequency offset elimination on each of the signal points, it means that the frequency offset elimination is performed on the entire received signal. In an example, for the elimination of the frequency offset of each of the signal points on the constellation diagram by using the frequency offset estimate, a symbol of the received symbol with frequency offset eliminated r'(n) may be calculated as:

$$r'(n) = r(n) \cdot e^{-j2\pi f n},$$

where r(n) represents the n-th symbol of the received signal, i.e., the n-th signal point on the constellation diagram; f represents the frequency offset estimate; e is the base of the natural logarithm, j is an imaginary unit, and T is the well-known mathematical constant, the ratio of a circle's circumference to its diameter.

After r'(n) is calculated, the value of the real part and the value of the imaginary part of r'(n) are thus determined, such that r'(n) can be plotted on the constellation diagram. When all symbols of the received signal with the frequency offset eliminated are plotted on the constellation diagram, the corrected constellation diagram is obtained.

After the corrected constellation diagram corresponding to each of the frequency offset estimate is obtained, the corrected constellation diagram will be subject to clustering, so as to calculate the area of the signal region of the clustered signal points on the constellation diagram.

In an embodiment, the clustering of the signal points on the corrected constellation diagram may include the following steps S11-S13.

At step S1, the corrected constellation diagram is evenly divided into multiple grid cells.

In the embodiment, the areas of the grid cells are equal. In practice, the number of grid cells may be determined based on actual needs.

At step S12, the number of signal points in each grid cell is calculated.

After the corrected constellation diagram is evenly divided into multiple grid cells, each of the signal points on the corrected constellation diagram will be in a certain grid cell. Therefore, the number of signal points in each grid cell may be calculated, so as to determine the category of the grid cell.

At step S13, for each grid cell, when the number of the signal points in the grid cell is less than a preset threshold, the grid cell is used as a non-cluster grid cell, otherwise, the grid cell is used as a cluster grid cell.

In the embodiment, a preset threshold may be set, and the grid cells are classified based on the preset threshold. That is, a grid cell having less than the preset threshold signal points is classified as a non-cluster grid cell, and a grid cell having not less than the preset threshold signal points is classified as a cluster grid cell. The preset threshold may be set based on experience. For ease of representation, cluster grid cells may be shown in black, and non-cluster grid cells may be shown in white.

When the categories of all the grid cells are determined, the clustering for the corrected constellation diagram is completed. The area of the signal region in the corrected constellation after clustering may be calculated.

In an embodiment, the calculation of the area of the signal region in the corrected constellation diagram after clustering may include the following steps S21-S22.

At step S21, the number K of cluster grid cells in the constellation diagram after clustering is calculated.

As described above, the cluster grid cells may be shown in black, and the non-cluster grid cells may be shown in white. Therefore, in the embodiment, the number of black grid cells in the corrected constellation diagram after clustering may be calculated, which is the number K of the cluster grid cells. Of course, various other ways may be employed to calculate the number of the cluster grid cells in the corrected constellation diagram after clustering, which is not limited in present application.

At step S22, the area S of the signal region in the corrected constellation diagram after clustering is determined as S=K×s, where s is the area of a cluster grid cell.

In the embodiment, the number of signal points in each of the cluster grid cells is greater than or equal to the preset threshold. A cluster grid cell may be regarded as a sub signal region, and the set of all sub signal regions constitutes the signal region. Therefore, the area S of the signal region in the corrected constellation diagram after clustering may be the sum of the areas of all the cluster grid cells.

At step S104, a frequency offset estimate corresponding to a signal region with a minimum area is determined as the value of the frequency offset.

The inventors recognized in research that, for a received signal with frequency offset presented, the larger the frequency offset of the received signal is, that is, the more the frequency is shifted, the larger the degree of rotation of the constellation diagram of the received signal will be. The larger the degree of rotation of the constellation diagram of the received signal is, the larger the area of the signal region in the constellation diagram will be. In other words, frequency offset will increase the area of the signal region in the constellation diagram. For example, as shown in FIG. 2b, the constellation diagram for an 8-PSK (8 Phase Shift Keying) signal with frequency offset is rotated relative to the constellation diagram for an 8-PSK signal without frequency offset. As shown in FIG. 2c, the constellation diagram for a 16-QAM (Quadrature Amplitude Modulation) signal with frequency offset is rotated relative to the constellation diagram for a 16-QAM signal without frequency offset. As shown in FIG. 2d, the constellation diagram for a 16-ASK (16 Amplitude Shift Keying) signal with frequency offset is rotated relative to the constellation diagram for a 16-ASK signal without frequency offset.

In view of this, in the embodiment, if a frequency offset estimate corresponds to a signal region with the minimum area, the correction of the constellation diagram of the received signal based on this frequency offset estimate will produce the best result. This frequency offset estimate is closest to the value of the true frequency offset of the received signal, and therefore this frequency offset estimate may be determined as the value of the frequency offset. The determined value of the frequency offset may be used in frequency offset elimination of the received signal.

The solution of the embodiments of the present application takes into account the fact that the more severe the frequency offset is, the more the area of the signal region in the constellation diagram of the received signal will increase. In determining the frequency offset of the received signal, a constellation diagram for the received signal is determined; and N different values are then determined within a preset frequency interval, which are used as N frequency offset estimates. For each frequency offset estimation value, a corrected constellation diagram is obtained by correcting the constellation diagram using the frequency offset estimate, and the signal points on the corrected constellation diagram are clustered. The area of the signal region of the clustered signal points on the constellation diagram is calculated. A frequency offset estimate corresponding to a signal region with the minimum area is determined a value of the true frequency offset. In the embodiments of the present application, no argument of the received signal is required to be calculated, instead, the value of the frequency offset is estimated based on the fact that the area of the signal region in the constellation diagram is directly proportional to the value of the frequency offset. As a result, the accuracy and stability of the calculated value of the frequency offset can be improved, leading to a better estimation of the frequency offset.

Figure 2A:
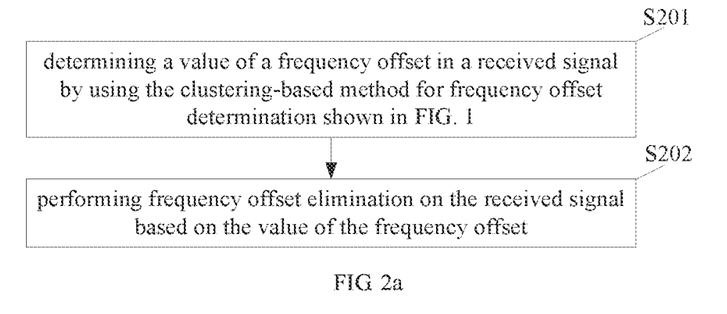
FIG. 2a shows a flowchart of a clustering-based method for frequency offset elimination provided by an embodiment of the present application.
Figure 2B:
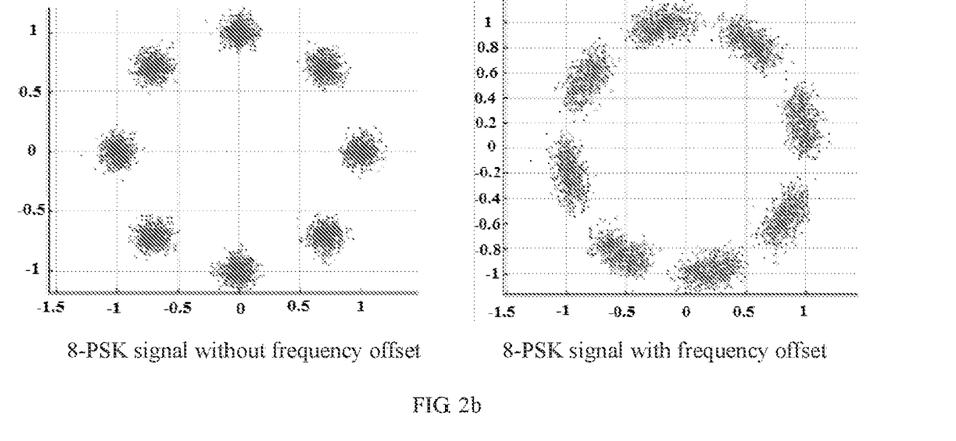
FIG. 2b shows constellation diagrams for an 8-PSK signal without frequency offset and with frequency offset.
Figure 2C:
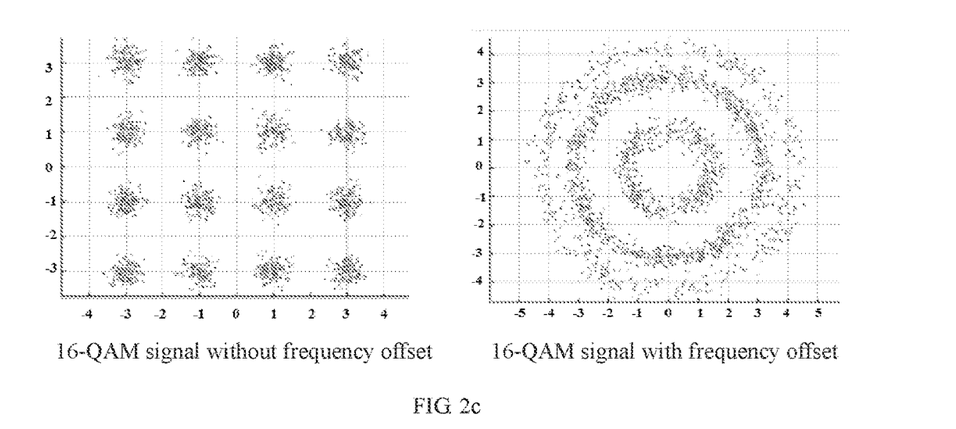
FIG. 2c shows constellation diagrams for a 16-QAM signal without frequency offset and with frequency offset.
Figure 2D:
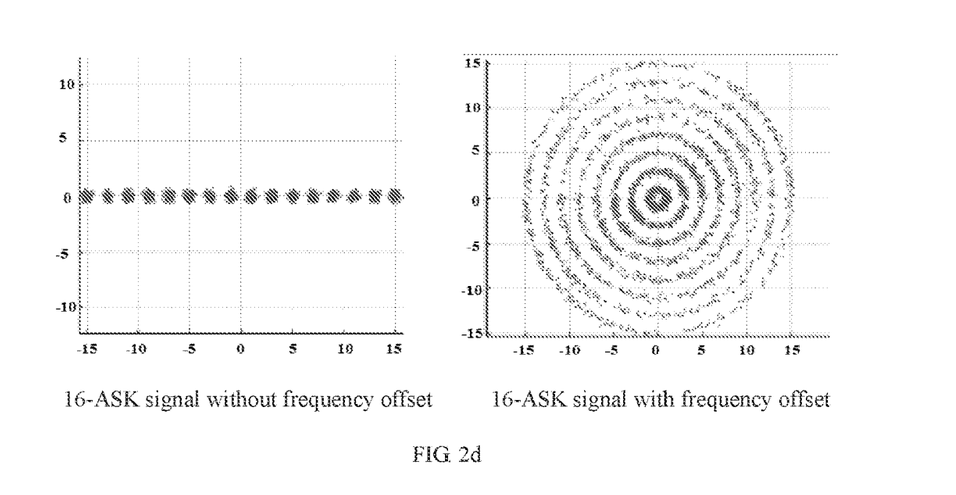
FIG. 2d shows constellation diagrams for a 16-ASK signal without frequency offset and with frequency offset.

FIG. 2a shows a clustering-based method for frequency offset elimination provided by an embodiment of the present application, which may include the following steps.

At step S201, a value of a frequency offset of a received signal is determined by using the clustering-based method for frequency offset determination as shown in FIG. 1.

The received signal refers to a digital signal received by a receiver during wireless communication. Therefore, the clustering-based methods for frequency offset determination provided by the embodiments of the present application may be implemented by a receiver in a wireless communication system.

In the embodiment, the determined value of the frequency offset of the received signal is closest to the true value of the frequency offset of the received signal. Therefore, the determined value of the frequency offset of the received signal can be used to perform frequency offset elimination on the received signal with the frequency offset.

At step S202, frequency offset elimination is performed on the received signal based on the value of the frequency offset.

Specifically, the frequency offset elimination is performed on the signal points on the constellation diagram of the received signal using the value of the frequency offset, to obtain a constellation diagram with the frequency offset eliminated. In an example, the frequency offset elimination may be performed on each of the signal points on the constellation diagram of the received signal using the value of the frequency offset in a similar manner as the frequency offset elimination performed at step S103, which is not described herein again.

In the embodiments of the present application, no argument of the received signal is required to be calculated, instead, the value of the frequency offset of the received signal is estimated based on the fact that the area of the signal region in the constellation diagram is directly proportional to the value of the frequency offset. The determined value of the frequency offset is then used to eliminate the frequency offset of the received signal. As a result, the accuracy and stability of the calculated value of the frequency offset can be improved, leading to a better estimation of the frequency offset.

Figure 2E:
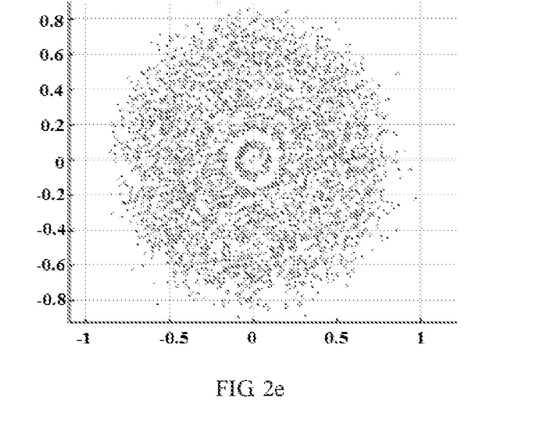
FIG. 2e shows a constellation diagram for a 128-QAM signal with frequency offset.
Figure 2F:
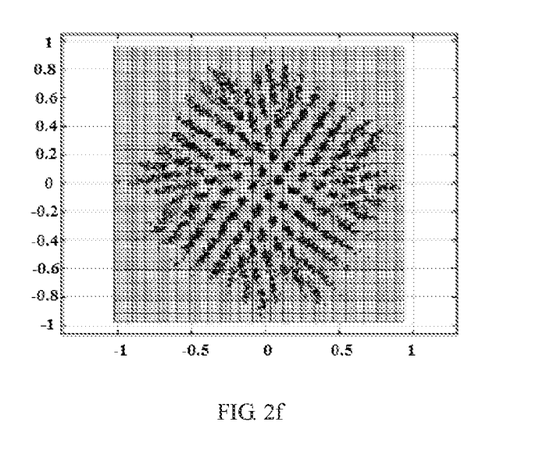
FIG. 2f shows the constellation diagram shown in FIG. 2e after a correction.
Figure 2G:
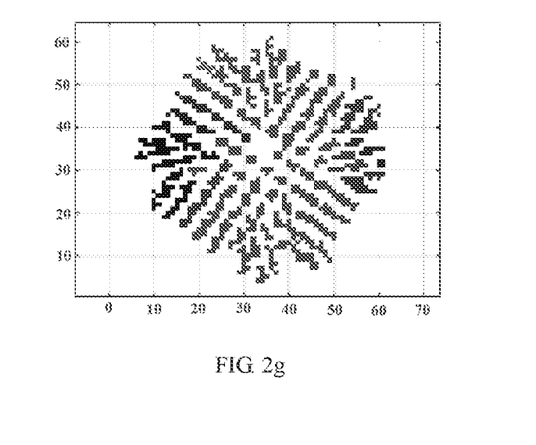
FIG. 2g shows the constellation diagram shown in FIG. 2f after clustering.
Figure 2H:
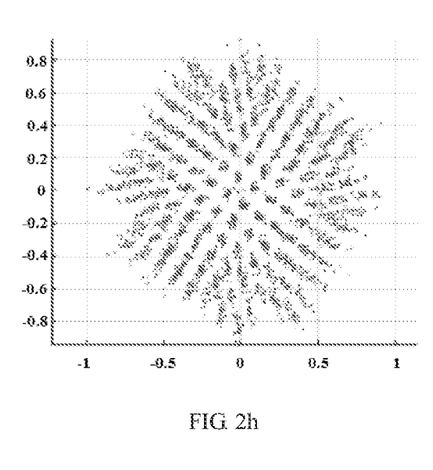
FIG. 2h shows the constellation diagram shown in FIG. 2e with the frequency offset eliminated.

A simulation experiments is established to implement the clustering-based method for frequency offset elimination provided herein, so as to verify the advantages of the methods in the present application. In the simulation experiment, firstly, a constellation diagram for a 128-QAM signal with frequency offset is given, as shown in FIG. 2e. It can be seen from the figure, the constellation diagram of the 128-QAM signal is severely rotated, which means that a large frequency offset is present in the received 128-QAM and the signal is distorted to a large extent. The constellation diagram shown in FIG. 2e is then corrected based on a certain frequency offset estimate to obtain a corrected constellation diagram, and the corrected constellation diagram is evenly divided into multiple grid cells, as shown in FIG. 2f. It can be seen from the figure, the rotation of the constellation diagram has been corrected to some extent, such that the rotation of the constellation diagram is reduced. Next, the signal points on constellation diagram shown in FIG. 2f are clustered to obtain a constellation diagram after clustering, as shown in FIG. 2g. It can be seen from the figure, the cluster grid cells are shown in black, and the non-cluster grid cells are shown in white, such that the signal region and the non-signal region can be distinguished easily and visually to facilitate the determination of the area of the signal region. Finally, the frequency offset estimate corresponding to the signal region with the minimum area is selected as the value of the frequency offset by comparing the areas of the signal regions in the constellation diagrams corresponding to respective frequency offset estimates. The frequency offset elimination is performed on the received 128-QAM signal using the value of the frequency offset, to obtain a constellation diagram with the frequency offset eliminated; as shown in FIG. 2h. It can be seen from the figure, the constellation diagram with the frequency offset eliminated shows no obvious rotation, which means that the corrected constellation diagram is close to the constellation diagram without the frequency offset. As seen from the result of the simulation experiment, the clustering-based method for frequency offset elimination provided by the embodiment of the present application can better eliminate the frequency offset of the received signal, and the calculated value of the frequency offset is accurate and stable.

Figure 3:
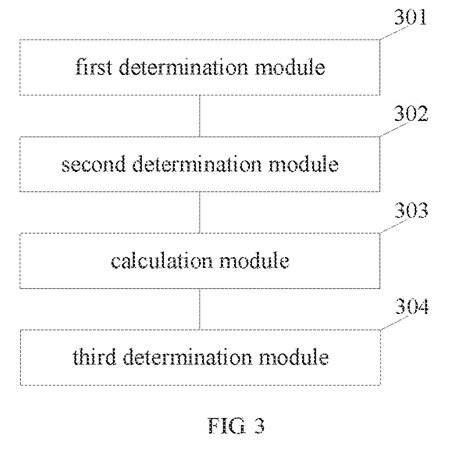
FIG. 3 shows a structural diagram of a clustering-based apparatus for frequency offset determination provided by an embodiment of the present application.

Corresponding to the embodiment of the method shown in FIG. 1, an embodiment of the present application provides a clustering-based apparatus for frequency offset determination. As shown in FIG. 3. The apparatus includes a first determination module 301, a second determination module 302, a calculation module 303, and a third determination module 340.

The first determination module 301 is configured for determining a constellation diagram for a received signal.

The second determination module 302 is configured for determining N different values within a preset frequency interval, as N frequency offset estimates for a frequency offset of the received signal.

The calculation module 303 is configured for, for each of the frequency offset estimates, correcting the constellation diagram based on the frequency offset estimate to obtain a corrected constellation diagram, clustering signal points on the corrected constellation diagram, and calculating an area of a signal region in the corrected constellation diagram after clustering.

The third determination module 340 is configured for determining a frequency offset estimate corresponding to a signal region with a minimum area as a value of the frequency offset.

The solution of the embodiments of the present application takes into account the fact that the more severe the frequency offset is, the more the area of the signal region in the constellation diagram of the received signal will increase. In determining the frequency offset of the received signal, a constellation diagram for the received signal is determined; and N different values are then determined within a preset frequency interval, which are used as N frequency offset estimates. For each frequency offset estimation value, a corrected constellation diagram is obtained by correcting the constellation diagram using the frequency offset estimate, and the signal points on the corrected constellation diagram are clustered. The area of the signal region of the clustered signal points on the constellation diagram is calculated. A frequency offset estimate corresponding to a signal region with the minimum area is determined a value of the true frequency offset. In the embodiments of the present application, no argument of the received signal is required to be calculated, instead, the value of the frequency offset is estimated based on the fact that the area of the signal region in the constellation diagram is directly proportional to the value of the frequency offset. As a result, the accuracy and stability of the calculated value of the frequency offset can be improved, leading to a better estimation of the frequency offset.

Optionally, the second determination module 302 is specifically configured for selecting from the preset frequency interval the N different values at equal intervals.

Optionally, the calculation module 303 is specifically configured for performing frequency offset elimination on each of the signal points on the constellation diagram by using the frequency offset estimate to obtain the corrected constellation diagram.

Optionally, the calculation module 303 is specifically configured for: dividing evenly the corrected constellation diagram into multiple grid cells; calculating the number of signal points in each grid cell; and for each grid cell, using the grid cell as a non-cluster grid cell when the number of the signal points in the grid cell is less than a preset threshold; and using the grid cell as a cluster grid cell when the number of the signal points in the grid cell is not less than the preset threshold.

Optionally, the calculation module 303 is specifically configured for: calculating the number K of cluster grid cells in the corrected constellation diagram after clustering; and calculating the area S of the signal region in the corrected constellation diagram after clustering, as S=K×s; wherein s is an area of a cluster grid cell.

Figure 4:
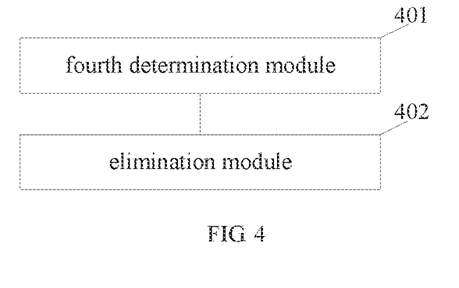
FIG. 4 shows a structural diagram of a clustering-based apparatus for frequency offset elimination provided by an embodiment of the present application.

Corresponding to the embodiment of the method shown in FIG. 2a, an embodiment of the present application provides a clustering-based apparatus for frequency offset elimination. As shown in FIG. 4, the apparatus includes a fourth determination module 401 and an elimination module 402.

The fourth determination module 401 is configured for determining a value of a frequency offset of a received signal by using the clustering-based method for frequency offset determination shown in FIG. 3.

The elimination module 402 is configured for performing frequency offset elimination on the received signal based on the value of the frequency offset.

In the embodiments of the present application, no argument of the received signal is required to be calculated, instead, the value of the frequency offset of the received signal is estimated based on the fact that the area of the signal region in the constellation diagram is directly proportional to the value of the frequency offset. The determined value of the frequency offset is then used to eliminate the frequency offset of the received signal. As a result, the accuracy and stability of the calculated value of the frequency offset can be improved, leading to a better estimation of the frequency offset.

Figure 5:
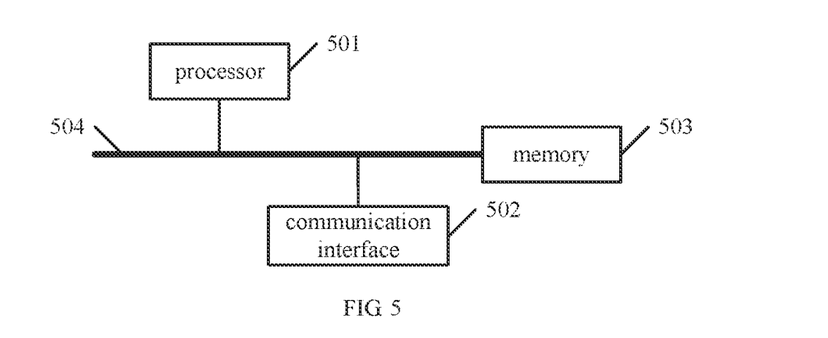
FIG. 5 shows a schematic structural diagram of an electronic device provided by an embodiment of the present application.

An embodiment of the present application further provides an electronic device, as shown in FIG. 5, which includes a processor 501, a communication interface 502, a memory 503 and a communication bus 504. The processor 501, the communication interface 502 and the memory 503 communicate with each other via the communication bus 504.

The memory 503 is configured for storing a computer program.

The processor 501 is configured for, when executing the computer program stored in the memory 503, implementing the clustering-based method for frequency offset determination of any one of the above embodiments.

The solution of the embodiments of the present application takes into account the fact that the more severe the frequency offset is, the more the area of the signal region in the constellation diagram of the received signal will increase. In determining the frequency offset of the received signal, a constellation diagram for the received signal is determined; and N different values are then determined within a preset frequency interval, which are used as N frequency offset estimates. For each frequency offset estimation value, a corrected constellation diagram is obtained by correcting the constellation diagram using the frequency offset estimate, and the signal points on the corrected constellation diagram are clustered. The area of the signal region of the clustered signal points on the constellation diagram is calculated. A frequency offset estimate corresponding to a signal region with the minimum area is determined a value of the true frequency offset. In the embodiments of the present application, no argument of the received signal is required to be calculated, instead, the value of the frequency offset is estimated based on the fact that the area of the signal region in the constellation diagram is directly proportional to the value of the frequency offset. As a result, the accuracy and stability of the calculated value of the frequency offset can be improved, leading to a better estimation of the frequency offset.

Figure 6:
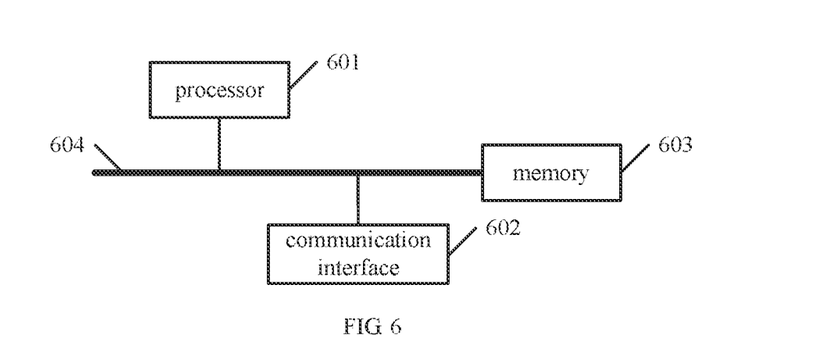
FIG. 6 shows a schematic structural diagram of another electronic device provided by an embodiment of the present application.

An embodiment of the present application further provides another electronic device, as shown in FIG. 6, which includes a processor 601, a communication interface 602, a memory 603 and a communication bus 604. The processor 601, the communication interface 602 and the memory 603 communicate with each other via the communication bus 604.

The memory 603 is configured for storing a computer program.

The processor 601 is configured for, when executing the computer program stored in the memory 603, implementing the clustering-based method for frequency offset elimination of any one of the above embodiments.

In the embodiments of the present application, no argument of the received signal is required to be calculated, instead, the value of the frequency offset of the received signal is estimated based on the fact that the area of the signal region in the constellation diagram is directly proportional to the value of the frequency offset. The determined value of the frequency offset is then used to eliminate the frequency offset of the received signal. As a result, the accuracy and stability of the calculated value of the frequency offset can be improved, leading to a better estimation of the frequency offset.

The communication buses in the above electronic devices may be a Peripheral Component Interconnect (PCI) bus or an Extended Industry Standard Architecture (EISA) bus and the like. The communication buses may include an address bus, a data bus, a control bus, or the like. For ease of representation, the communication buses are shown as a thick line in the figures respectively, which does not mean that there is only one communication bus or one type of communication bus.

The communication interfaces are configured for communication between the respective electronic advices and other advices.

The memories may include a Random Access Memory (RAM), or may include a non-volatile memory, for example at least one disk memory. Optionally, the memories may also be at least a storage located separate from the above processors.

The above processors may be a general-purpose processor, including a Central Processing Unit (CPU), a Network Processor (NP), or the like; it may also be a Digital Signal Processor (DSP), an Application Specific Integrated Circuit (ASIC), a Field-Programmable Gate Array (FPGA) or other programmable logic means, a discrete gate or transistor logic means, or a discrete hardware component.

In another embodiment of the present application, a computer readable storage medium is provided. The computer readable storage medium has stored thereon instructions that, when executed by a computer, cause the computer to perform the clustering-based method for frequency offset determination of any of the above embodiments, so as to achieve same technical effects.

In still another embodiment of the present application, another computer readable storage medium is provided. The computer readable storage has stored thereon instructions that, when executed by a computer, cause the computer to perform the clustering-based method for frequency offset elimination of any of the above embodiments, so as to achieve same technical effects.

In yet another embodiment of the present application, a computer program product is provided. The computer program product includes instructions that, when executed by a computer, cause the computer to perform the clustering-based method for frequency offset determination of any of the above embodiments, so as to achieve same technical effects.

In yet another embodiment of the present application, a computer program product is provided. The computer program product includes instructions that, when executed by a computer, cause the computer to perform the clustering-based method for frequency offset elimination of any of the above embodiments, so as to achieve same technical effects.

The above embodiments may be implemented or partly implemented by software, hardware, firmware, or any combination thereof. When implemented by software, the embodiments may be implemented or partly implemented as a computer program product. The computer program product includes one or more computer instructions. When the computer instructions are loaded and executed on a computer, the processes or functions according to the embodiments of the present application are generated in whole or in part. The computer may be a general purpose computer, a special purpose computer, a computer network, or other programmable units. The computer instructions can be stored in a computer readable storage medium and can be transmitted from a computer readable storage medium to another computer readable storage medium. For example, the computer instructions may be transmitted from a node of a website, computer, server or data center to another site of a website, computer, server or data center via wired (for example, a coaxial-cable, a fiber, a Digital Subscriber Line (DSL)) or wireless means (for example, infrared, radio, microwave, etc.). The computer readable storage medium may be any available medium that can be accessed by a computer or may be a data storage including one or more integrated available mediums, such as a server, data center, or the like. The available medium may be a magnetic medium (for example, a floppy disk, a hard disk, a magnetic tape), an optical medium (for example, a DVD), or a semiconductor medium (for example, a Solid State Disk (SSD)), etc.

It should be noted that the relationship terms herein, such as "first". "second" and the like are only used to distinguish one entity or operation from another entity or operation, but do not necessarily require or imply that there is any actual relationship or order between these entities or operations. Moreover, the terms "include", "comprise", or any variants thereof are intended to cover a non-exclusive inclusion, such that processes, methods, articles or devices, including a series of elements, include not only those elements that have been listed, but also other elements that are not specifically listed or elements intrinsic to these processes, methods, articles or devices. Without further limitations, elements defined by the wording "include(s) a/an . . . " or "comprise(s) a/an . . . " do not exclude additional identical elements in the processes, methods, articles, or devices that include the listed elements.

All of the embodiments in the description are described in a correlated manner, and description of a component in an embodiment may apply to another containing the same. The description for each embodiment focuses on the differences from other embodiments. In particular, a brief description is given to the embodiments of the apparatuses, electronic devices, storage media, and computer program products in view of their resemblance with the method embodiments. Relevant details can be known with reference to the description of the method embodiments.

The embodiments described above are only preferable embodiments of the present application, and are not intended to limit the scope of protection of the present application. Any modification, equivalent, and improvement within the spirit and principle of the present application are all within the scope of protection of the present application.

The invention claimed is:

1. A clustering-based method for frequency offset determination, comprising:
   determining a constellation diagram for a received signal;
   determining N different values within a preset frequency interval, as N frequency offset estimates for a frequency offset of the received signal;
   for each of the frequency offset estimates, correcting the constellation diagram based on the frequency offset estimate to obtain a corrected constellation diagram, clustering signal points on the corrected constellation diagram, and calculating an area of a signal region in the corrected constellation diagram after clustering; and
   determining a frequency offset estimate corresponding to a signal region with a minimum area as a value of the frequency offset;
   wherein clustering signal points on the corrected constellation diagram, comprises:
   dividing evenly the corrected constellation diagram into multiple grid cells;
   calculating the number of signal points in each grid cell; and
   for each grid cell, using the grid cell as a non-cluster grid cell when the number of the signal points in the grid cell is less than a preset threshold; and using the grid cell as a cluster grid cell when the number of the signal points in the grid cell is not less than the preset threshold.

2. The method of claim 1, wherein determining N different values within a preset frequency interval, comprises:
   selecting from the preset frequency interval the N different values at equal intervals.

3. The method of claim 1, wherein correcting the constellation diagram based on the frequency offset estimate to obtain a corrected constellation diagram, comprises:
   performing frequency offset elimination on each of the signal points on the constellation diagram by using the frequency offset estimate to obtain the corrected constellation diagram.

4. The method of claim 1, wherein calculating an area of a signal region in the corrected constellation diagram after clustering, comprises:
   calculating the number K of cluster grid cells in the corrected constellation diagram after clustering; and
   calculating the area S of the signal region in the corrected constellation diagram after clustering, as $S=K \times s$; wherein s is an area of a cluster grid cell.

5. A clustering-based method for frequency offset elimination, comprising:
   determining a value of a frequency offset of a received signal by using the clustering-based method for frequency offset determination of claim 1; and
   performing frequency offset elimination on the received signal based on the value of the frequency offset.

6. An electronic device, comprising a processor, a communication interface, a memory and a communication bus; wherein the processor, the communication interface and the memory communicate with each other via the communication bus;
   the memory is configured for storing a computer program; and
   the processor is configured for, when executing the computer program stored in the memory, implementing the method of claim 5.

7. An electronic device, comprising a processor, a communication interface, a memory and a communication bus; wherein the processor, the communication interface and the memory communicate with each other via the communication bus;
   the memory is configured for storing a computer program; and
   the processor is configured for, when executing the computer program stored in the memory, implementing the method of claim 1.

8. A clustering-based apparatus for frequency offset determination, comprising:
   a first determination module, configured for determining a constellation diagram for a received signal;
   a second determination module, configured for determining N different values within a preset frequency interval, as N frequency offset estimates for a frequency offset of the received signal;
   a calculation module, configured for, for each of the frequency offset estimates, correcting the constellation diagram based on the frequency offset estimate to obtain a corrected constellation diagram, clustering signal points on the corrected constellation diagram, and calculating an area of a signal region in the corrected constellation diagram after clustering; and a third determination module, configured for determining a frequency offset estimate corresponding to a signal region with a minimum area as a value of the frequency offset;

wherein, the calculation module further configured for:

dividing evenly the corrected constellation diagram into multiple grid cells;

calculating the number of signal points in each grid cell; and for each grid cell, using the grid cell as a non-cluster grid cell when the number of the signal points in the grid cell is less than a preset threshold; and using the grid cell as a cluster grid cell when the number of the signal points in the grid cell is not less than the preset threshold.

9. A clustering-based apparatus for frequency offset elimination, comprising:

a fourth determination module, configured for determining a value of a frequency offset of a received signal by using the clustering-based apparatus for frequency offset determination of claim 8; and an elimination module, configured for performing frequency offset elimination on the received signal based on the value of the frequency offset.

* * * * *

UNITED STATES PATENT AND TRADEMARK OFFICE
CERTIFICATE OF CORRECTION

PATENT NO. : 11,218,354 B2
APPLICATION NO. : 17/270176
DATED : January 4, 2022
INVENTOR(S) : Zhiyong Feng et al.

It is certified that error appears in the above-identified patent and that said Letters Patent is hereby corrected as shown below:

In the Specification

Column 6, the formula on Line 26 should recite:
$r'(n) = r(n) \cdot e^{-j2\pi fn}$, Signed and Sealed this
Twenty-sixth Day of July, 2022

Katherine Kelly Vidal
*Director of the United States Patent and Trademark Office*